(12) United States Patent
Pax et al.

(10) Patent No.: US 10,033,148 B2
(45) Date of Patent: *Jul. 24, 2018

(54) WAVEGUIDE DESIGN FOR LINE SELECTION IN FIBER LASERS AND AMPLIFIERS

(71) Applicant: Lawrence Livermore National Security, LLC, Livermore, CA (US)

(72) Inventors: Paul H Pax, Livermore, CA (US); Graham S Allen, Pleasanton, CA (US); Jay W Dawson, Livermore, CA (US); Derek Reginald Drachenberg, Livermore, CA (US); Victor V Khitrov, San Ramon, CA (US); Michael J Messerly, Danville, CA (US); Nick Schenkel, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/288,590

(22) Filed: Oct. 7, 2016

(65) Prior Publication Data

US 2017/0229834 A1     Aug. 10, 2017

Related U.S. Application Data

(60) Provisional application No. 62/291,483, filed on Feb. 4, 2016.

(51) Int. Cl.
*G02B 6/02* (2006.01)
*H01S 3/067* (2006.01)
(Continued)

(52) U.S. Cl.
CPC ........ *H01S 3/06741* (2013.01); *G02B 6/0238* (2013.01); *G02B 6/02338* (2013.01);
(Continued)

(58) Field of Classification Search
None
See application file for complete search history.

(56) References Cited

U.S. PATENT DOCUMENTS

| 4,986,629 A | 1/1991 | Auge et al. |
| 5,594,747 A | 1/1997 | Ball |

(Continued)

OTHER PUBLICATIONS

Alcock et al., "Tunable, Continuous-Wave Neodymium-Doped Monomode-Fiber Laser Operating at 0.900-0.945 and 1.070-1.135μm," Optics Lett., vol. 11, No. 11, 1986, pp. 709-711.
(Continued)

*Primary Examiner* — Tina Wong
(74) *Attorney, Agent, or Firm* — John P. Wooldridge

(57) ABSTRACT

Rare earth doped fiber lasers can be robust and efficient sources of high quality light, but are usually limited to the highest gain transitions of the active species. But rare earths typically possess a multitude of potentially useful transitions that might be accessed if the dominant transition can be suppressed. In fiber lasers this suppression is complicated by the very high net gain the dominant transitions exhibit; effective suppression requires some mechanism distributed along the length of the fiber. We have developed a novel waveguide with resonant leakage elements that frustrate guidance at well-defined and selectable wavelengths. Based on this waveguide, we have fabricated a Large Mode Area Neodymium doped fiber with suppression of the four-level transition around 1060 nm, and demonstrated lasing on the three-level transition at 930 nm with good efficiency.

33 Claims, 18 Drawing Sheets

(51) Int. Cl.
G02B 6/14 (2006.01)
H01S 3/16 (2006.01)
H01S 3/094 (2006.01)

(52) U.S. Cl.
CPC ........... *G02B 6/02347* (2013.01); *G02B 6/14* (2013.01); *H01S 3/06716* (2013.01); *H01S 3/06733* (2013.01); *H01S 3/094007* (2013.01); *H01S 3/1603* (2013.01); *H01S 3/1611* (2013.01)

(56) References Cited

U.S. PATENT DOCUMENTS

| | | | |
|---|---|---|---|
| 6,363,194 B1 | 3/2002 | DiGiovanni et al. | |
| 6,836,607 B2 | 12/2004 | Dejneka et al. | |
| 6,961,497 B2 * | 11/2005 | Kim | G02B 6/125 385/28 |
| 7,038,844 B2 * | 5/2006 | Dawson | H01S 3/06704 359/341.1 |
| 7,876,495 B1 * | 1/2011 | Minelly | C03B 37/0122 359/341.1 |
| 7,999,228 B2 * | 8/2011 | Staniforth | B82Y 20/00 250/338.1 |
| 8,089,688 B2 | 1/2012 | Lobo Ribeiro et al. | |
| 9,217,826 B2 | 12/2015 | Logunov et al. | |
| 9,749,043 B2 * | 8/2017 | Perron | H04B 10/07955 |
| 2003/0185505 A1 | 10/2003 | Weisberg et al. | |
| 2009/0016387 A1 | 1/2009 | Durkin et al. | |
| 2011/0188825 A1 * | 8/2011 | Alkeskjold | B29D 11/00663 385/126 |
| 2012/0320451 A1 | 12/2012 | MuendelMuendel | |
| 2017/0229834 A1 * | 8/2017 | Pax | H01S 3/06741 |
| 2017/0229838 A1 * | 8/2017 | Dawson | G02B 6/02338 |

OTHER PUBLICATIONS

Aozasa et al., "1480-1510 nm-Band Tm Doped Fiber Amplifier (TDFA) with a High Power Conversion Efficiency of 42%," NTT Photonics Labs, NTT Electronics Corp., pp. PD1-PD3.
Bartolacci et al., "Effects of Ions Clustering in Nd3+/AL3+-Codoped Double-Clad Fiber Laser Operating Near 930 nm," Appl. Phys. B., 98, 2010, pp. 317-322.
Clesca et al., "Raman Amplification for High-Capacity, Long-Haul Networking," Optics and Photonics News, 2015, pp. 34-39.
Dawson et al., "Scalable 11W 938nm Nd3+ Doped Fiber Laser," MD8, OSA/ASSP, 2004, 3 pp.
Dvoyrin et al., "Bismuth-Doped-Glass Optical Fibers—A New Active Medium for Lasers and Amplifiers," Optics Lett., vol. 31, No. 20, 2006, pp. 2966-2968.
Hakimi et al., "Glass Fiber Laser at 1 .36μm from Sio2:Nd," Optics Lett., vol. 14, No. 19, 1989, pp. 1060-1061.
Harun et al., "An Overview on S-Band Erbium-Doped Fiber Amplifiers," Laser Phys. Lett. 4, No. 1, 2007, www.Iphys.org, pp. 10-15.

Htein et al., "Amplification at 1400-1450 nm of the Large-Core Nd-Doped Fiber by White LED Pumping," IEEE Photonics Tech. Lett., vol. 25, No. 11, 2013, pp. 1081-1083.
Ishikawa et al., "Laser Emission and Amplification at 1.3μm in Neodymium-Doped Fluorophasphate Fibres," Electron. Lett., vol. 28, No. 16,1992, pp. 1497-1499.
Kane et al., "3-Watt Blue Source Based on 914-nm Nd:YVO4 Passively-Q-Switched Laser Amplified in Cladding-Pumped Nd:Fiber," OSA/ASSP, 2004, 3 pp.
Komukai et al., "Highly Efficient and Tunble Nd3+ Doped Fluoride Fibre Laser Operating in 1.3μm Band," Electron. Lett., vol. 29, No. 9, 1993, pp. 755-758.
Laroche et al., "20 W Continuous-Wave Cladding-Pumped Nd-Doped Fiber Laser at 910 nm," Optics Lett., vol. 38, No. 16, 2013, pp. 3065-3067.
Lumholt et al., "Optimum Placement of Filters in 1300 nm Nd-Fibre Amplifiers," Optics Comm., Elsevier Science Publishers, vol. 89, 1992, pp. 30-32.
Mears et al., "Neodymium-Doped Silica Single-Mode Fibre Lasers," Electron. Lett., vol. 21, No. 17, 1985, pp. 738-740.
Miniscalco et al., "1.3μm Fluoride Fibre Laser," Electron. Lett., vol. 24, No. 1, 1987, pp. 28-29.
Miyajima et al., "1.31-1.36μm Optical Amplification in Nd3+–Doped Fluorozirconate Fibre," Electron. Lett., vol. 26, No. 3, 1990, pp. 194-195.
Morkel et al., "Spectral Variation of Excited State Absorption in Neodymium Doped Fiber Lasers," Optics Comm., vol. 67, No. 5, 1988, pp. 349-352.
Naftaly et al., "ND3+–Doped Fluoraluminate Glasses for a 1.3μm Amplifier," J. of App. Phys., vol. 87, No. 5, 2000, pp. 2098-2104.
Pax et al., "Scalable Waveguide Design for Three-Level Operation in Neodymium Doped Fiber Laser," Unpublished Document, 12 pp.
Payne et al., "Progress in the Development of Efficient 1.3μm Fibre Amplifiers," ECOC, 1998, pp. 11-13.
Poole, et al., "Fabrication of Low-Loss Optical Fibres Containing Rare-Earth Ions," Electron. Lett., vol. 21, No. 17, 1985, pp. 737-738.
Reekie et al., "Tunable Single-Mode Fiber Lasers," J. of Lightwave Tech., vol. LT-4, No. 7, 1986, pp. 956-960.
Soh et al., Neodymium-Doped Cladding-Pumped Aluminosilicate Fiber Laser Tunable in the 0.9-μm Wavelenth., IEEE J. of Quantum Elect., vol. 40, No. 9, 2004, pp. 1275-1282.
Thipparapu et al., "Bi-Doped Fiber Amplifier with a Flat Gain of 25 dB Operating in the Wavelength Band 1320-1360 nm," Optics Lett., vol. 41, No. 7, 2016, pp. 1518-1521.
Zemon et al., "Excited-State-Absorption Cross Sections and Amplifier Modeling in the 1300-nm Region for Nd-Doped Glasses," IEEE Photonics Tech. Lett., vol. 4, No. 3, 1992, pp. 244-247.
International Search Report and Written Opinion for PCT/US2017/015577 corresponding to U.S. Appl. No. 15/288,590, 12 pages.
Chen et al., "Design of Add-Drop Multiplexer Based on Multi-Core Optical Fibers for Mode-Divisional Multiplexing," Optics Express, vol. 22, No. 2, 2014, pp. 1440-1451.
International Search Report and Written Opinion for PCT/US2017/054181, 12 pages.

* cited by examiner

WAVEGUIDE DESIGN FOR LINE SELECTION IN FIBER LASERS AND AMPLIFIERS

CROSS-REFERENCE TO RELATED APPLICATIONS

This application claims the benefit of U.S. Provisional Patent Application No. 62/291,483 titled "Waveguide Design for Line Selection in Fiber Lasers and Amplifiers," filed Feb. 4, 2016, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to waveguides, and more specifically, it relates to techniques for line selection in such devices.

Description of Related Art

Neodymium lasers typically operate on the four-level transition ($^4F_{3/2} \rightarrow {}^4I_{11/2}$) at around 1060 nm due to its large cross section and ease of generating a population inversion. However, there is a quasi-three-level transition around 900-940 nm ($^4F_{3/2} \rightarrow {}^4I_{9/2}$) that is interesting for spectral sensing applications and for its reduced quantum defect. It is challenging to operate a Neodymium-doped fiber laser on the three-level transition around 930 nm. The same issues apply to fiber lasers with other active dopants having multiple transitions.

The challenge for three-level operation of an Nd-doped fiber laser is that the four-level transition achieves inversion much more easily, and typically has a higher gain coefficient. Because of this, the four-level transition will be the first to reach the lasing threshold, after which the gain is clamped, preventing other transitions from reaching threshold.

In a fiber amplifier, the situation is relaxed somewhat because the desired transition is selected by external seeding. However, there will still be competition with the unwanted transition; given the waveguide confinement and high net gain provided by the fiber, ASE on the competing transition can reduce the gain available to the desired one, reduce efficiency and pollute the output. For this reason, active suppression of the unwanted transition is still critical.

One prior art method of accessing the three-level transition relies on careful selection of glass composition to enhance its gain coefficient, along with high intensity pumping to ensure inversion, and bend induced waveguide losses that favor shorter wavelengths. In this case the fiber length is constrained by the requirement that inversion be high over its entire length, with the consequence that efficiency suffers because the pump is incompletely absorbed. Also, while bending does provide wavelength selective loss distributed along the fiber, its selectivity is not great and requires careful adjustment. Finally, for the common double-clad fiber configuration, the need for high pump intensity constrains the clad:core ratio, limiting the prospects for power scaling.

Another prior art method employs a depressed-well core design, which makes a sharp transition from guided to unguided at some wavelength. This design fulfills the need for highly selective distributed loss, but should be considered a short pass edge filter rather than a bandpass filter. Furthermore, the depressed-well design becomes unacceptably tolerance sensitive for large cores, limiting power scaling. Nevertheless, some impressive results have been achieved using it.

A method for active suppression of the unwanted transition uses a hybrid Photonic Crystal/Photonic Bandgap (PCF-PBG) structure for distributed filtering along the fiber. The structures are hybrid in the sense that the modes are confined to the core by a combination of PCF and PBG features. PCF and PBG structures support versatile and robust spectral features and provide an extensive design space for the modal and spectral properties of optical fibers.

SUMMARY OF THE INVENTION

An embodiment of the present invention is a modification of the photonic crystal fiber design. The basic structure is constructed as a hexagonal array of elements around a seven cell core that is index matched to silica. Core guidance is provided by low index inclusions within the array. The low index inclusions are chosen to yield nearly single mode (low effective NA) behavior, with a large mode area. In addition to the low index elements, there are six strings (or "spokes") of graded index (GRIN) elements with higher index leading from the core to the undoped silica cladding. (In one design, the GRINs are arranged in "spokes", but other arrangements are possible and may provide advantages in certain cases.) Guided modes are supported in both the central core and the GRINs. In the core, the modes propagate with an effective index lower than the undoped silica cladding. In the GRINs, the modes propagate with an effective index higher than the cladding, for wavelengths below the cutoff wavelength of the mode, but lower than the cladding near cutoff. When the core and GRIN modes become resonant, they hybridize and the optical field becomes delocalized amongst these two parts of the structure. When this occurs, the optical field of the core is effectively exposed to the undoped cladding part of the structure. Since this region possesses an index higher than the effective index of the mode, light preferentially leaks into it, and the core experiences a loss.

By choice of the pitch of the hexagonal array of elements, and the relative index and fill fraction of the low index (PCF) and high index (GRIN) elements, it is possible to arrange for the resonance between the core and GRINs to occur at a wide range of wavelengths. Away from resonance, the properties of the core are decoupled from the GRINs: the core properties (e.g., size and mode count) are effectively independent of the filtering we apply, so that power scaling is not adversely affected. Furthermore, by the additional choice of number and placement of the GRIN elements, it is possible to adjust the width of the resonance and level of core loss. Finally, simulations and experiments show that this structure is compatible with coiling of the fiber.

The invention is useful for spectral management of gain in fiber lasers and amplifiers. It applies to directly emitting species, as well as frequency conversion schemes. Examples include, but are not limited to: (1) Neodymium three-level transition around 930 nm, useful for remote sensing (e.g., water vapor) and underwater communications (by harmonic conversion to the blue-green); (2) Neodymium transitions around 1.400 nm and 1800 nm, useful for fiber telecommunications; (3) Erbium/Ytterbium co-doped fibers at 1550 nm, useful for power scaling by suppression of parasitic lasing around 1 μm; (4) Samarium doped fibers, for lines other than the dominant 651 nm line, e.g., 565 nm, 600 nm, 680 nm, 727 nm; (5) Terbium doped fibers, for lines other than the dominant 543 nm line, e.g., 420 nm, 445 nm; (6) Thulium doped up-conversion fibers at 1470 nm, by suppression of the dominant transition around 2 μm; and (7) ribbon fibers (slab waveguides implemented as fibers). In the case of ribbon fiber, both spectral and modal control can be exerted by judicious design of the leakage elements.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Embodiments of the present invention include a fiber that is based on the photonic crystal fiber (PCF) design that further includes raised index inclusions outside of the core area. A PCF consists of a background glass of constant index, a lattice of depressed index elements, and a core defined by the substitution of one or several lattice elements by glass typically of the same index as the background. The lattice can be thought of as defining a cladding of reduced average index compared to the core, and the core supports what are essentially index guided modes. There are three important indices to consider in a PCF: (i) the background glass index, (ii) the effective index of the so-called space filling mode (SFM), and (iii) the effective index of the guided modes of the core. The background glass is the substrate for the PCF; it has the highest index and constitutes a lossy environment or sink for any light leaking from the PCF structure. The SFM is the fundamental mode of an infinite cladding lattice and has the highest effective index of the lattice modes. The effective index of any modes guided in the core lies between the SFM and the background glass indices. Because the lattice consists of index depressions, all the core and lattice mode indices are below that of the background glass. For a finite sized lattice, any such modes will have a non-zero leakage into the environment. But core modes decay exponentially in the lattice, so their leakage can be made arbitrarily small by expanding the lattice.

Embodiments of the present invention include a modification of the basic PCF design by substituting raised index elements for some of the lattice sites. Embodiments of this invention use Graded Index (GRIN) inclusions for this purpose. Step index rods can also be used. The GRINs have an index that is higher than the background glass and support true guided modes. When surrounded by the depressed lattice they may also support modes with an effective index lower than the background glass but higher than the SFM, and like the core modes these may have an arbitrarily small loss. However, the effective index of their modes decrease towards that of the SFM with increasing wavelength, and crucially, any higher order GRIN mode will be cutoff (lose guidance) at some wavelength. The modes of a GRIN that is only partially surrounded by the lattice will experience high losses if its effective index is lower than the background glass.

Figure 1:
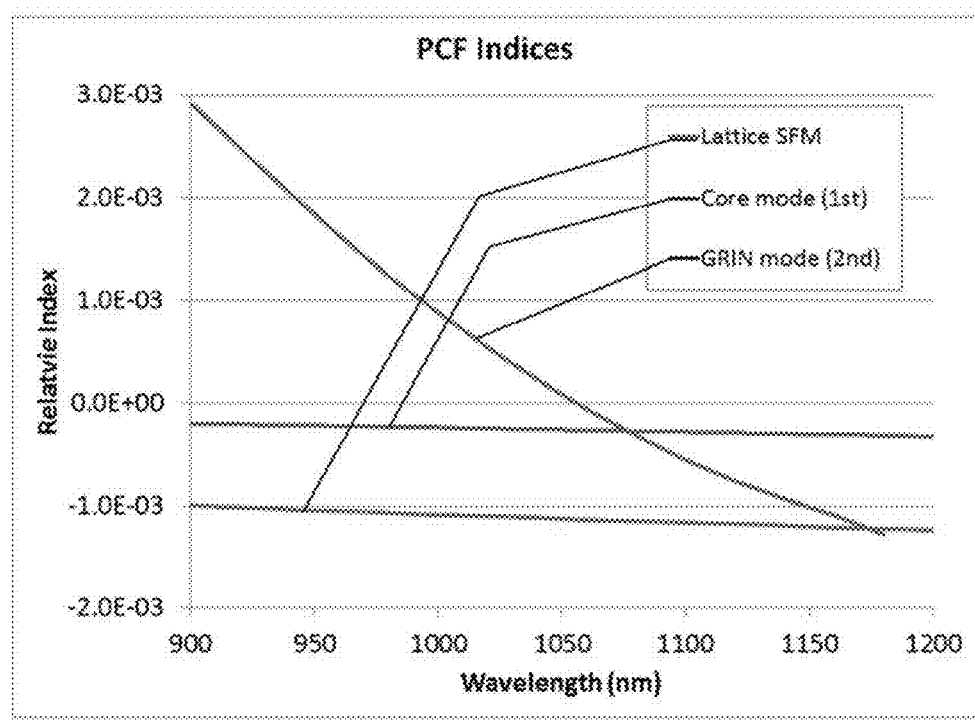
FIG. 1 shows the effective indices for the space filling mode (SFM), $1^{st}$ mode of the core and $2^{nd}$ mode of a single GRIN embedded in the lattice, relative to the background glass for parameters representative of the present waveguide.

By choice of the parameters of the lattice, the size of the core, and the size and index of the GRIN, the core and GRIN can be arranged to be resonant at some wavelength; at this point their modes will hybridize and the optical field becomes delocalized amongst these two parts of the structure. The GRIN inclusions are arranged as a channel from the PCF core to the edge of the lattice so that when the core and the GRIN become resonant, the optical field of the core is effectively exposed to the background glass (sink or drain) part of the structure. Since this region possesses an index that is higher than the effective index of the mode, light preferentially leaks into it, and the core experiences a loss. Away from resonance, the properties of the core are decoupled from the GRINs: the core properties (e.g., size and mode count) are effectively independent of the applied filtering, so that power scaling is not adversely affected. FIG. 1 shows the effective indices for the SFM, core $1^{st}$ mode and (single embedded) GRIN $2^{nd}$ mode, relative to the background glass for parameters representative of an embodiment of the present waveguide. In this case, the core and GRIN become resonant at about 1.080 nm and GRIN mode is cutoff at about 1180 nm.

Figure 2:
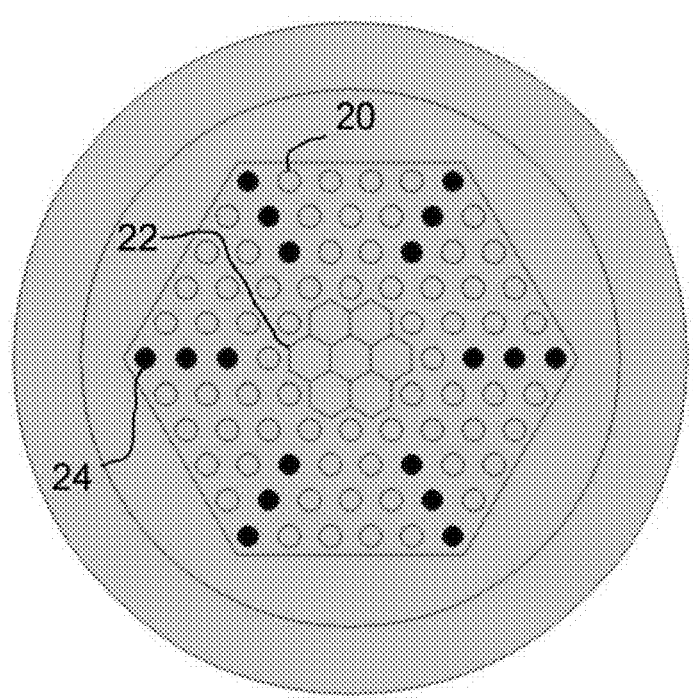
FIG. 2 shows an exemplary arrangement of the lattice elements (open circles), core (small hexagons) and GRINs (filled circles).

An embodiment of the present waveguide incorporates the features outlined above to suppress the Neodymium four-level transition ($^4F_{3/2} \rightarrow ^4I_{11/2}$) at around 1060 nm. It is based on a PCF structure: a hexagonal lattice of low index inclusions around a seven cell core. The core material is a homogenized combination of Neodymium-doped and Fluorine-doped silica. The homogenization was accomplished by the stack-and-draw process on a draw tower, with repeated iterations to yield sub-micron features and an index uniformity and match to silica of better than $10^{-4}$. The lattice parameters are chosen to yield nearly single mode (low effective NA) behavior, with a large mode area. Additionally, there are six strings (or "spokes") of graded index (GRIN) elements with higher index leading from the core to the undoped silica cladding. A single lattice low index inclusion was left between the core and the GRINs to tune the strength of their coupling at resonance. This tuning element may be modified to achieve finer tuning if necessary. Note that in some designs, the GRINs are arranged in "spokes", but other arrangements are possible and may provide advantages in certain cases. FIG. 2 shows the arrangement of the lattice elements (open circles) 20, core (small hexagons) 22 and GRINs (filled circles) 24. Specifically, the design parameters are as follows: (1) PCF pitch $\Lambda=8.0$ μm; (2) PCF index depressed elements: diameter $D/\Lambda=0.533$, NA0.14 (index step $\Delta=-6.743e-3$); (3) GRIN inclusions: diameter $D/\Lambda=0.5$, NA0.3 (index step $\Delta=3.071e-2$); and (4) Core: seven cells, Nd doped and index homogenized.

Figure 3:
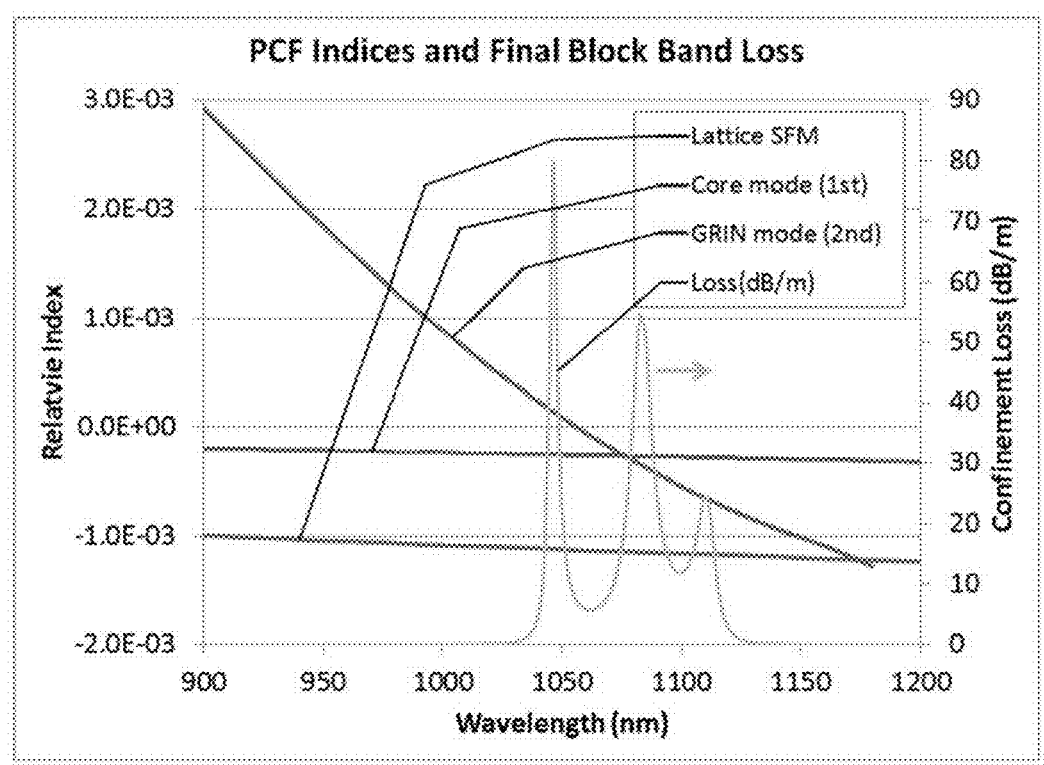
FIG. 3 shows the calculated block band loss for a straight fiber along with the index plot of FIG. 1.
Figure 4:
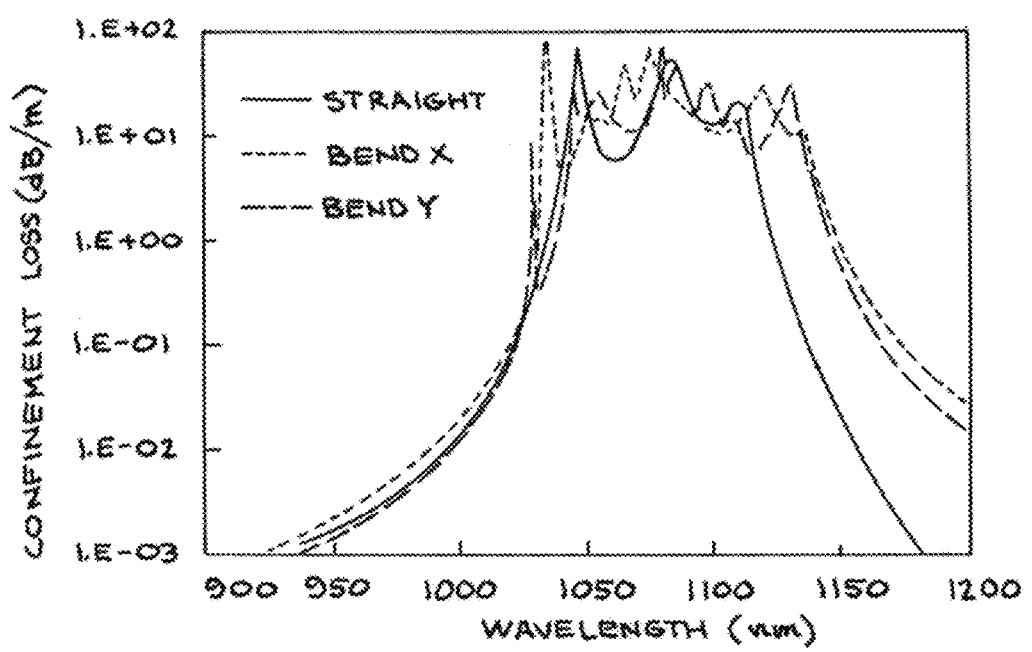
FIG. 4 is a comparison of the block band for straight and coiled fibers.

With these parameters, models indicate high losses at the $(^4F_{3/2} \rightarrow {}^4I_{11/2})$ transition. Furthermore, by the additional choice of number and placement of the GRIN elements, it is possible to adjust the width of the resonance and the level of the core loss. Simulations were conducted to verify that this structure is compatible with coiling of the fiber. FIG. 3 shows the calculated block band loss for a straight fiber along with the index plot of FIG. 1. FIG. 4 is a comparison of the block band for straight and coiled fibers. The appearance of three loss peaks is due to the three GRINs in each of the spokes: the modes of the adjacent GRINs combine to form 'super-modes' with effective index splitting that depends on their separation.

Figure 5A:
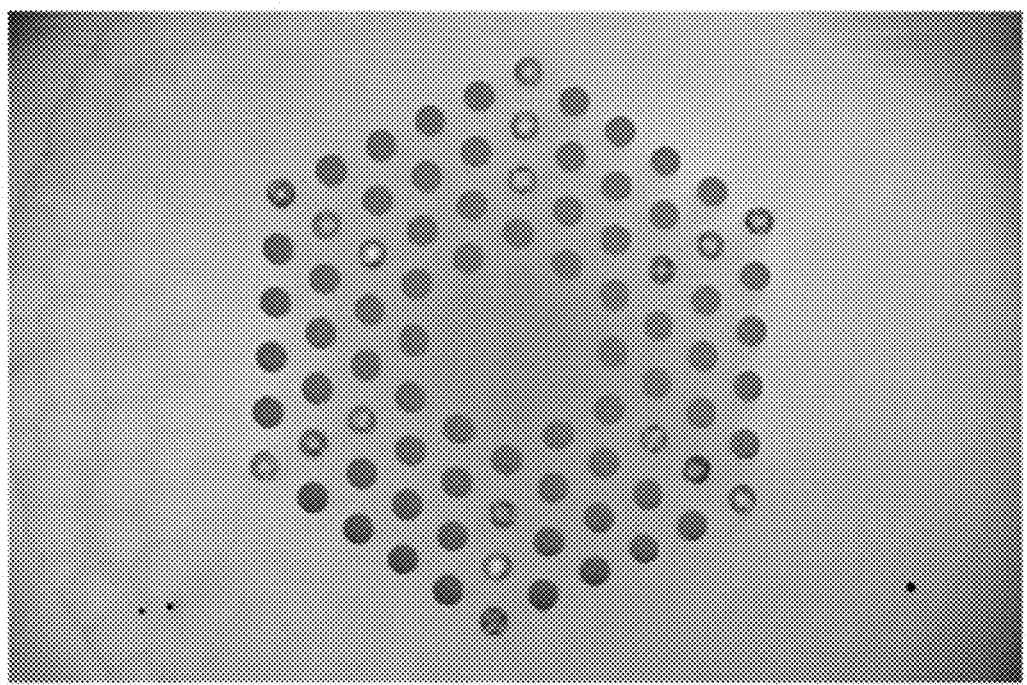
FIG. 5A shows an intermediate cane drawn for sizing before incorporation of the air cladding.
Figure 5B:
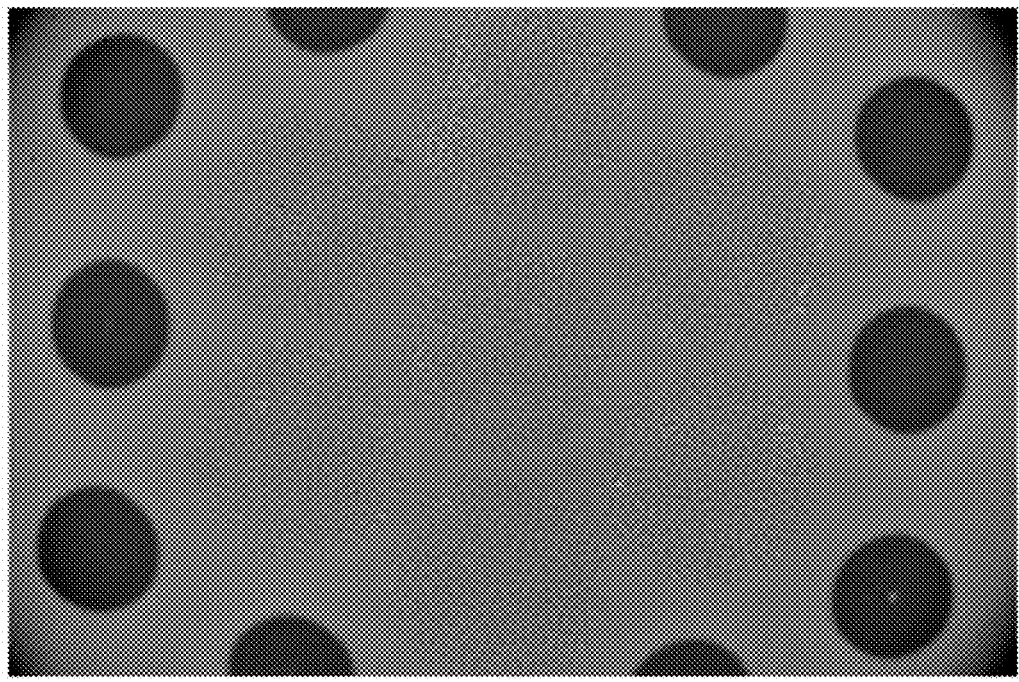
FIG. 5B is a zoom on the core region of that cane, showing the homogenized core material.
Figure 5C:
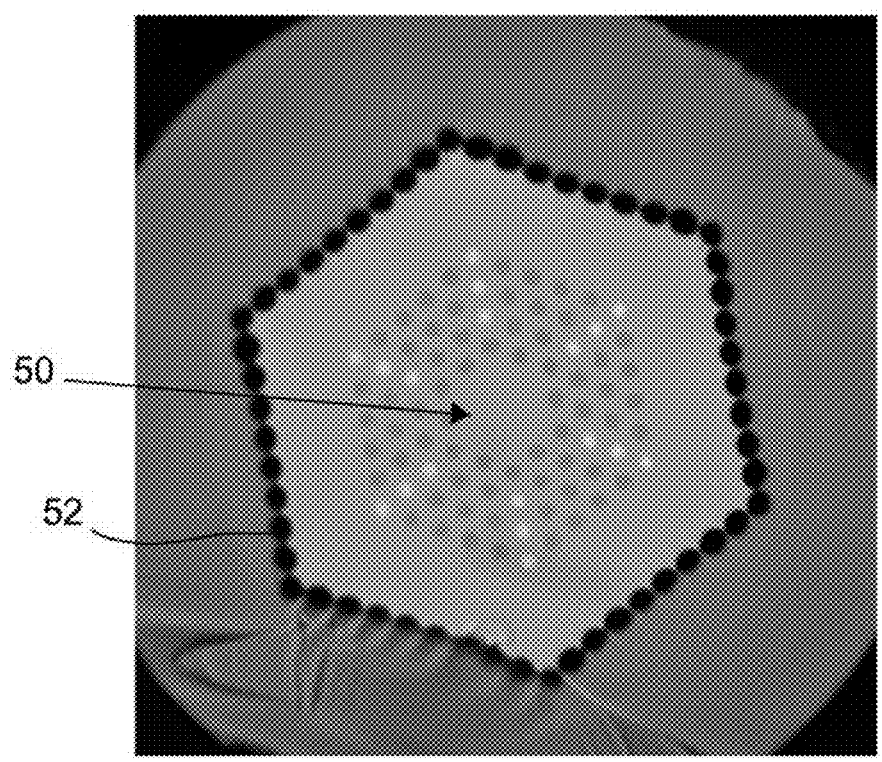
FIG. 5C shows the final drawn fiber, with fully homogenized core and surround air cladding.

As discussed above, a Neodymium doped fiber based on this design was fabricated using the stack-and-draw method on a draw tower. For comparison, a simple step index Nd-doped fiber using the same core material was fabricated. FIGS. 5A-5C respectively show stages of the process. FIG. 5A shows an intermediate cane drawn for sizing before incorporation of the air cladding. FIG. 5B is a zoom on the core region of that cane, showing the homogenized core material. FIG. 5C shows the final drawn fiber, with fully homogenized core 50 and surrounding air cladding 52.

Figure 6:
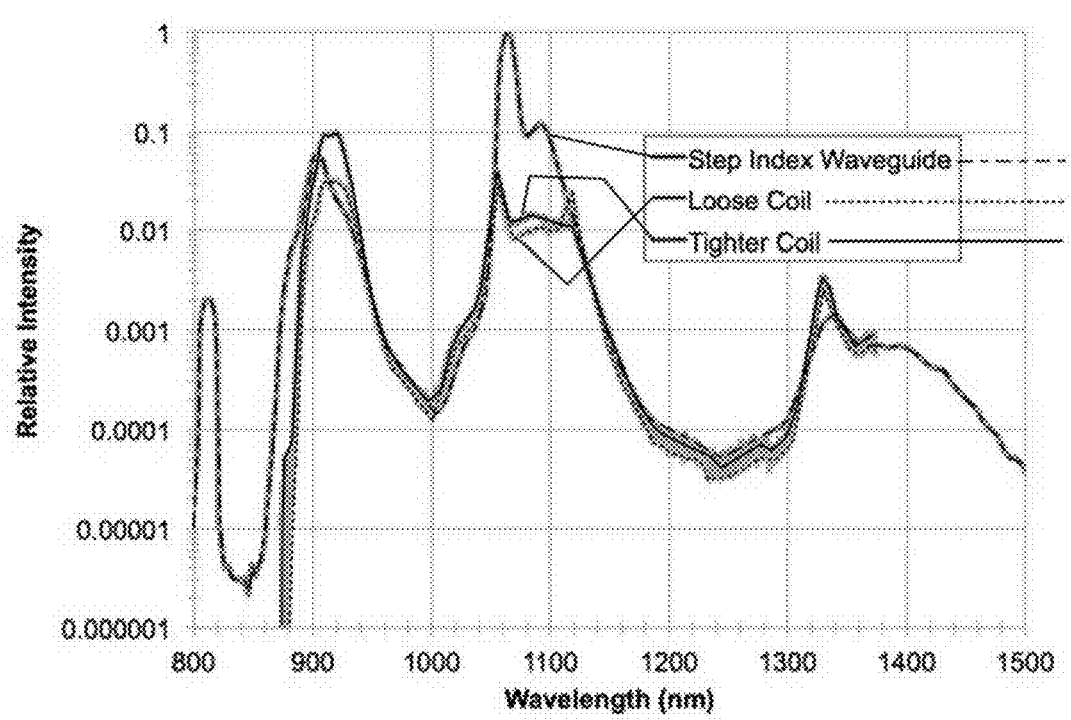
FIG. 6 shows that we achieved about 20 dB suppression with this waveguide.

Both the step index and the new line selecting fiber were pumped and the ASE spectrum was measured to confirm the filtering effect. FIG. 6 shows that about 20 dB suppression was achieved with this waveguide.

Figure 7:
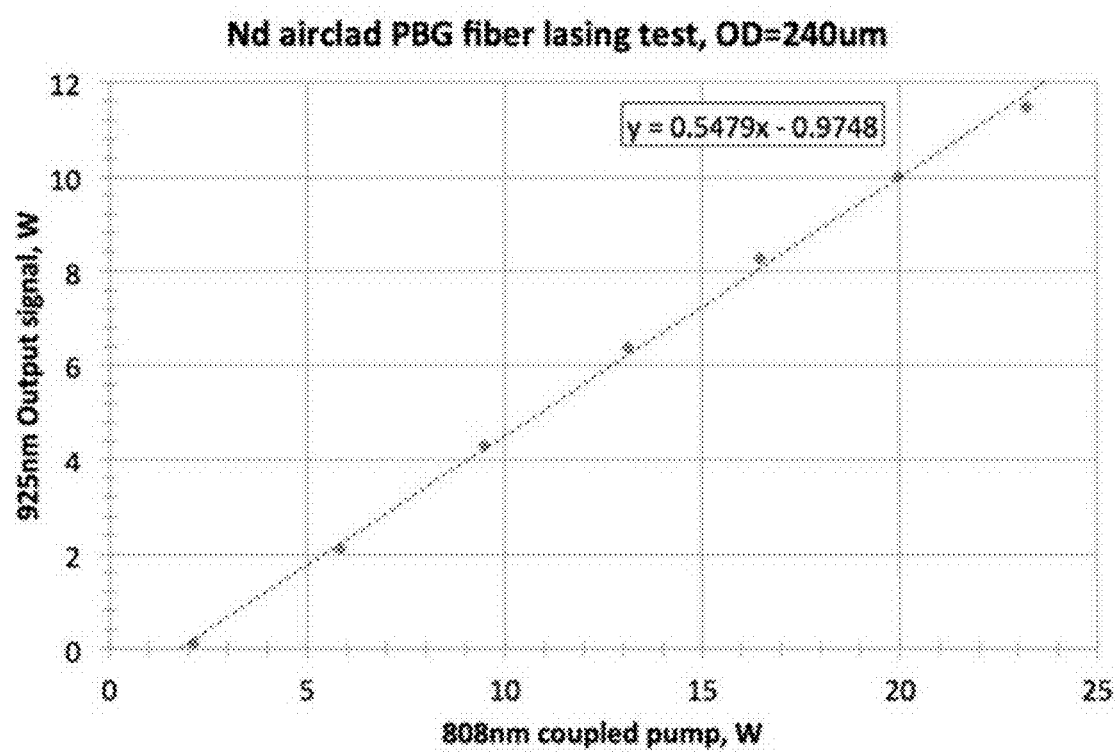
FIG. 7 shows the results of an Nd air-clad fiber laser test.
Figure 8A:
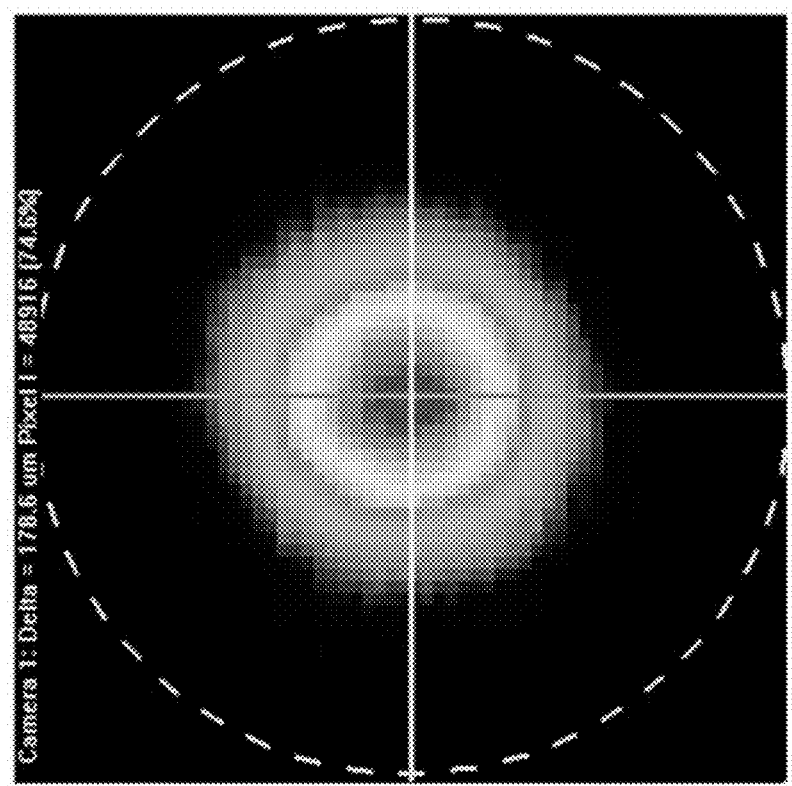
FIG. 8A shows the intensity of the output in orthogonal axes across the output spot.
Figure 8B:
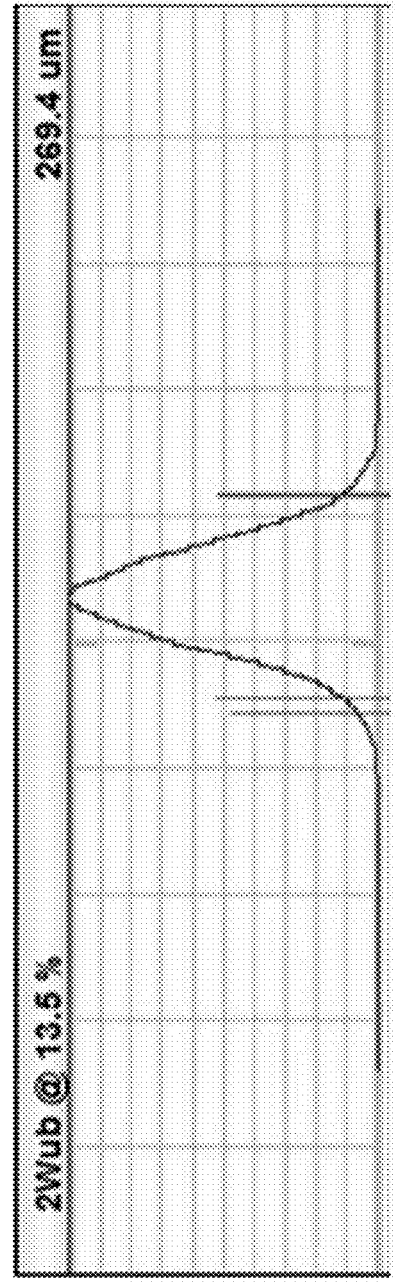
FIG. 8B is a plot of the intensity of the output on the horizontal axis of FIG. 8A.
Figure 8C:
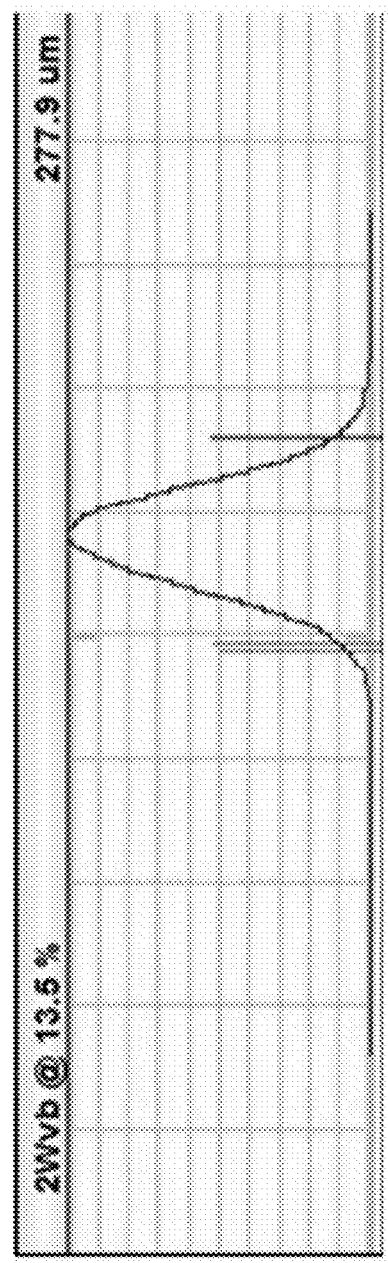
FIG. 8C is a plot of the intensity of the output on the vertical axis of FIG. 8A.

Lasing was achieved on the three-level $^4F_{3/2}$ to $^4I_{9/2}$ transition at 930 nm, with greater than 10 W output power and nearly 55% slope efficiency, and good beam quality. FIG. 7 shows the results of an Nd air clad fiber laser test. FIG. 8A shows the intensity of the output in orthogonal axes across the output spot. FIG. 8B is a plot of the intensity of the output on the horizontal axis of FIG. 8A. FIG. 8C is a plot of the intensity of the output on the vertical axis of FIG. 8A.

Figure 9:
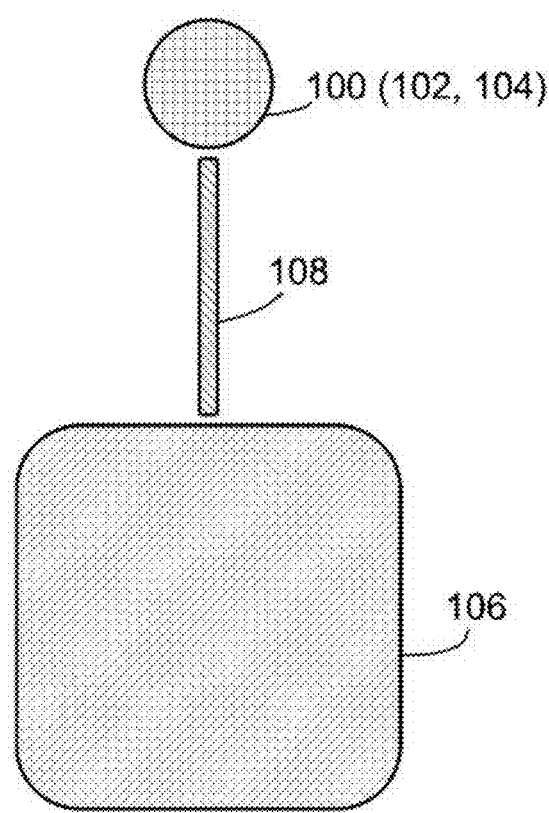
FIG. 9 shows a basic concept of the invention as a set of coupled waveguide elements.

The invention can be most generally described as a set of coupled waveguide elements, as shown in FIG. 9. Region 100 is a signal carrying waveguide region, guiding and confining light of the desired wavelength. In practice, region 100 usually consists of a core 102 and a depressed index region 104 as discussed below. Region 106 is a drain region (also referred to as a sink region), ideally removing any light coupled to it. Region 108 is an auxiliary waveguide region resonantly coupling regions 100 and 106.

The invention relates to optical waveguides in dielectric materials, specifically optical fibers (and amplifiers), which are typically longitudinally invariant. The critical waveguide properties are the modes they support, the coupling between these modes, and their propagation constants (or effective indices, $n_{eff}$). In particular, the present invention provides means to guide (and in some embodiments, to amplify) light of a given wavelength ($\lambda_1$) in the main element 100 while suppressing the guidance of light of a different, specific and undesired, wavelength ($\lambda_2$). This is accomplished by arranging that at $\lambda_2$, region 100 experiences wavelength selective coupling through the auxiliary waveguide 108 to the 'sink' region 106, with the result that light will flow out of 100 to 106. Region 100 and 106 should be sufficiently isolated that they experience no coupling except through region 108.

The conditions on the coupling between 100 and 108 require that these elements be in close proximity, and that the coupling between them be wavelength selective. The wavelength selective condition can be met if the effective indices ($n_{eff}$) of the relevant modes in the two elements are closely matched at only the undesired wavelength $\lambda_2$. This will be the case if in 100 the effective index $n_{eff,A}$ has only a weak dependence on wavelength, while in 106 the effective index $n_{eff,B}$ varies strongly with wavelength (high dispersion); or if the two indices vary strongly and oppositely with wavelength.

The conditions on the coupling between 108 and 106 require that these elements also be in close proximity, and that the coupling between them be substantially wavelength agnostic. The wavelength agnostic condition can be met if the region B supports many (ideally a continuum) modes with effective indices higher that of the relevant mode in C.

Finally, the requirement that region 106 constitute an effective 'sink' or 'drain' for any light entering it can be met by it being substantially dissipative (or absorbing, characterized by absorption coefficient an). Even if region 106 is not dissipative, it can still be a sink if it supports many more modes than 100, such that sharing of light between 100 and 106 reduces the light content in 100. But in this case there will be a further requirement to avoid coupling from 106 back onto 100: either the modes in 106 must experience strong and preferably randomly varying coupling (e.g., by longitudinal variations in its structure), or the distance over which light returns to region 100 (the 'revival' distance) must be much longer than the fiber in question.

The region 100 could include a 'step index' core of any shape having any positive index contrast (or Numerical Aperture, NA) with respect to the background glass; a typical step index core is a round one that supports only a single mode. Region 100 could also be a 'defect' (missing lattice element) in a Photonic Crystal Fiber (PCF) or Photonic Bandgap (PBG) fiber. Typically, the waveguiding core is round and supports only a single propagating mode, but hexagonal, rectangular (slab) or annular (ring) shapes are also possible; and the core could as well be multimode.

Region 106 could be of any shape, e.g., a shape confined within the fiber cross section; or more commonly, it could be in the shape of a ring surrounding the guiding elements in the core, comprising the fiber cladding and providing mechanical support. It could be made from an absorbing glass to provide dissipation; or it could be any large region (as suggested by the figure) of glass with a high refractive index $n_B$ to provide a multitude of modes.

The auxiliary coupling waveguide region 108 could be of any size, shape and index $n_C$, provided it supports at least one mode that is resonant ($n_{eff,C}=n_{eff,A}$) with the mode in 100 at $\lambda_2$ (the undesired wavelength), and has high dispersion. The dispersion requirement can usually be met by employing a spatially small structure of high index. As suggested by the figure, it could be an extended rectangular slab with the same index contrast ($n_B=n_A$) as region A, which would result in multiple modes in 108, moderately spaced in wavelength. One structure for region 108 is a string of smaller cores (sub-guides) in place of the slab. This would support 'supermodes' with effective indices clustered about those of a single sub-guide, which are much more widely spaced in wavelength than the modes of the slab; this is a desirable simplification allowing for better spectral control in the resulting fiber. The sub-guides could be any small structure supporting appropriate modes, e.g., step index cores. One sub-guide is a graded index (GRIN) core, because such a guide supports evenly spaced modes; and because they exhibit less scattering losses than step index cores.

One embodiment of the invention (hereafter referred to as the first embodiment) is based on so-called Photonic Crystal Fiber (PCF) design, and utilizes strings of Graded Index (GRIN) elements 108 for resonant coupling between the signal carrying waveguide region 100 and sink 106 regions.

Figure 10:
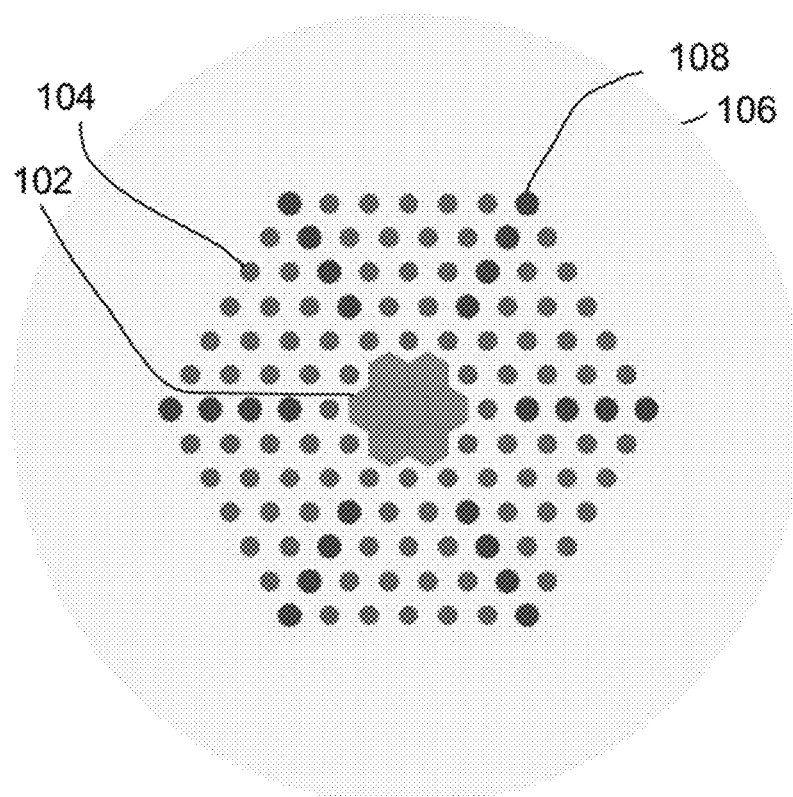
FIG. 10 shows an embodiment with a PCF structure defined by a lattice of depressed index regions.

Referring to FIG. 10, the signal carrying waveguide region of the PCF structure is defined by a core 102 and a lattice 104 of depressed index regions; the lattice is typically regular, but doesn't need to be. The area-average index in this region is below that of the background. The core 102 is formed by replacing some of the PCF elements with material of the same index as the background. The core region therefore has higher index than its surroundings, and so light can be guided by it. Note that the effective index of the modes guided in the core will be below the background material index.

The advantages of the PCF design over a simple step index core are much tighter control of the index in the region surrounding the core, as well as the ability to adjust the dispersive properties of that region. This is possible because the effective core index contrast is determined by the lattice average index, which is given by the choice of the two materials involved and by their geometrical arrangement. In a step index fiber, the contrast is determined by chemical manipulations of the core material properties, with which it is difficult or not possible to achieve the tolerances afforded by the PCF. This allows for large core mode areas, which is important to power scaling and which is impossible to achieve with the step index design and its variants.

The large drain region 106 outside of the lattice 108 is of the background material index, i.e., an index higher than the effective index of the core modes, and so can conveniently be used as the drain 106. We have fabricated fiber both with and without an integral pump cladding (see below); in the former case the sink is not dissipative but contains many modes, while in the latter case it is dissipative due to the presence of an absorbing outer coating.

Finally, there are six equivalent auxiliary resonant waveguide regions 108, to make the net coupling to the core independent of the orientation of fiber bending or coiling. The coupling waveguides are formed as a string of GRINs, each of which is a waveguide in itself. Making the resonant waveguide out of multiple smaller sub-guides has several advantages compared to a monolithic structure. The modes of such a structure can be thought of as 'supermodes', or specific combinations of the modes of the sub-guides. The propagation constants of these supermodes will be clustered around those of the corresponding modes of the sub-guides, i.e., they will be sparsely distributed; and the spread of these clusters depends on the coupling between those elements. Additionally, because the sub-guides are small the purely waveguide contribution to their dispersion can be high, and the supermodes will inherit this high dispersion. In contrast, a monolithic structure with a similar numbers of modes will have more evenly distributed modes, with much lower dispersion. Adjusting the size and index contrast of the GRIN sub-guides allows independent control of the position and width of the resonance condition with the core. Those practiced in the art will be familiar the design and properties of GRINs (see Snyder & Love, "Optical Waveguide Theory", Springer, 1983).

The specifics of the design are as follows. The background glass is high quality pure fused silica (e.g., Heraeus F300), and forms the sink 106. The preform is constructed as a regular hexagonal stack of precursor elements, or canes. When drawn, these canes become the unit cells of the fiber, and define its pitch. Hereafter, we will discuss the fiber in terms of its pitch and unit cells. The pitch of the final fiber was 8 μm, by design. The core 102 is a group of seven cells of pure fused silica doped with Nd and F, and homogenized to have the same refractive index as the background glass. The homogenization nominally achieved an index match to pure fused silica of better than $10^{-5}$. The Nd concentration is such that core bulk absorption of the 808 nm pump light is approximately 43 dB/m. The lattice 104 is formed by elements containing two materials arranged concentrically. The outer material is high quality pure fused silica (e.g., Heraeus F300). The inner material is fused silica doped with Fluorine to reduce its index, by $6.74\times10^{-3}$. The aspect ratio is (ID/OD) is 0.533. The resonant coupling waveguide regions 108 are formed by elements containing a GRIN profile. The first higher order mode of the GRIN is used, for its higher dispersion and its cutoff. The fundamental remains confined for all wavelengths, yielding a loss band that is wider than desired, stretching to longer wavelengths. It is desirable to limit the number of modes supported by the GRINs, as those that are not near cutoff will trap and waste pump light. There are six (degenerate, in a straight fiber) coupling waveguides of three GRINs each. This makes the structure independent of the orientation of fiber bending. The GRIN profile is embedded concentrically in a cylinder of pure fused silica. The GRIN profile is parabolic and has a peak index contrast of $3.07\times10^{-2}$. The aspect ratio is (ID/OD) is 0.5. The final fiber is composed of an optically active part surrounded by a thick passive part. The active part comprises the waveguide structure and the pump cladding. The waveguide structure comprises a hexagonal stack 17 cells from vertex-to-vertex. This waveguide structure is surrounded by one ring of hollow capillaries, which are inflated during the draw to form an air barrier to confine pump light (pump cladding). The passive part is a thick walled hollow tube of glass, and provides mechanical support.

Figure 11:
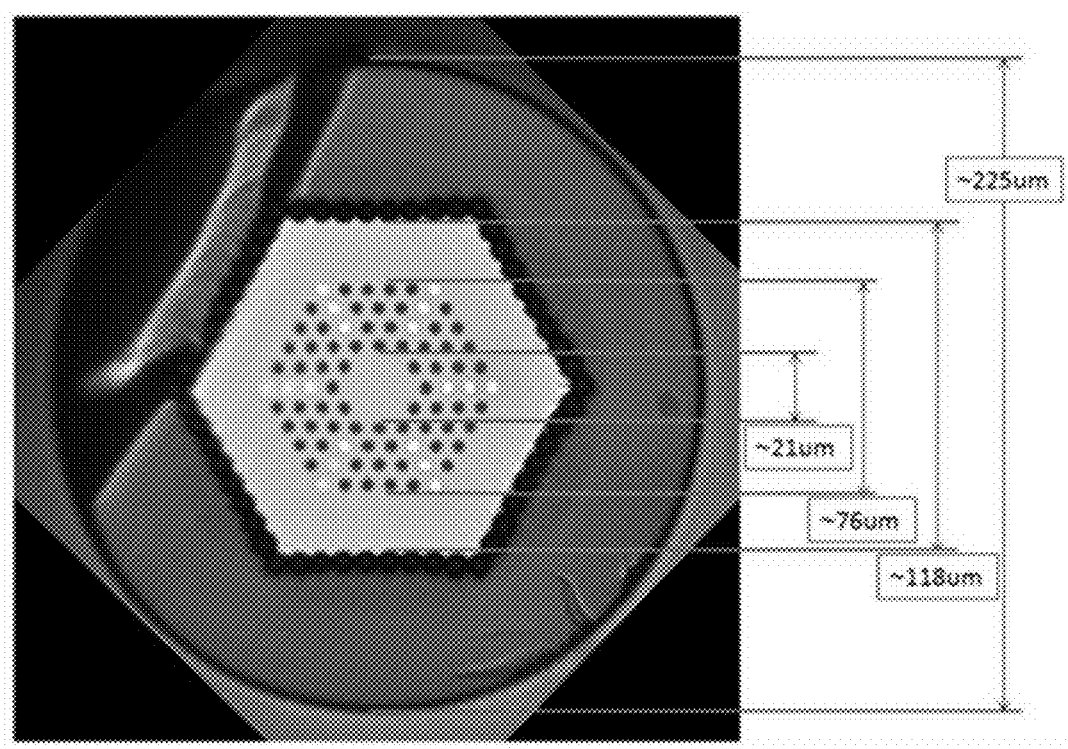
FIG. 11 shows the fabricated fiber cross section.

FIG. 11 shows the fabricated fiber cross section (the defect in the upper left of the image is a chip on the fiber end face due to cleaving the fiber, and is not present in the unbroken length of the fiber). The pump cladding is 118 um from hexagonal face-to-face, and the air barrier accepts pump light of up to NA0.3 (a measure of angular spread). The area of pump cladding to core areas is 31, so that the best case absorption of the pump light in the pump cladding by the Nd doped core will be 1.4 dB/m.

As discussed briefly above, FIG. 3 shows the calculated propagation constants (or effective indices) relative to the background glass, as well as the calculated wavelength selective core losses from the core 102 to the sink 106 via the resonant coupling waveguide 108. The features in this plot show that the preferred embodiment satisfies the conditions laid out in general rules of thumb section above. Specifically, the dispersion (wavelength dependence) of the core mode is weak over the wavelength range of interest, while that of the GRIN mode is much stronger. At their crossing, the light in the core will spread out across the GRINs; and as the indices of both modes are negative with respect to the material (background glass) index in the sink, light at the outermost GRIN will readily couple to the sink.

The plot shows the effective index of just one GRIN. But since each of the six equivalent coupling waveguides is composed of three GRINs there are three supermodes per waveguide, as outlined above. The result is three loss peaks induced by their coupling to the core mode. The spectral position and width of the loss band depends on the dispersions of the core and GRIN modes, and the spectral width of the supermodes. As mentioned above, these can be readily adjusted by the size and index contrast of the GRINs. We made the choice of index contrast based on its ready availability from commercial vendors, and this is likely near the practical limit of contrast. There is more flexibility with the size of the GRIN, specifically the aspect ratio (ID/OD) of the starting material.

Figure 12:
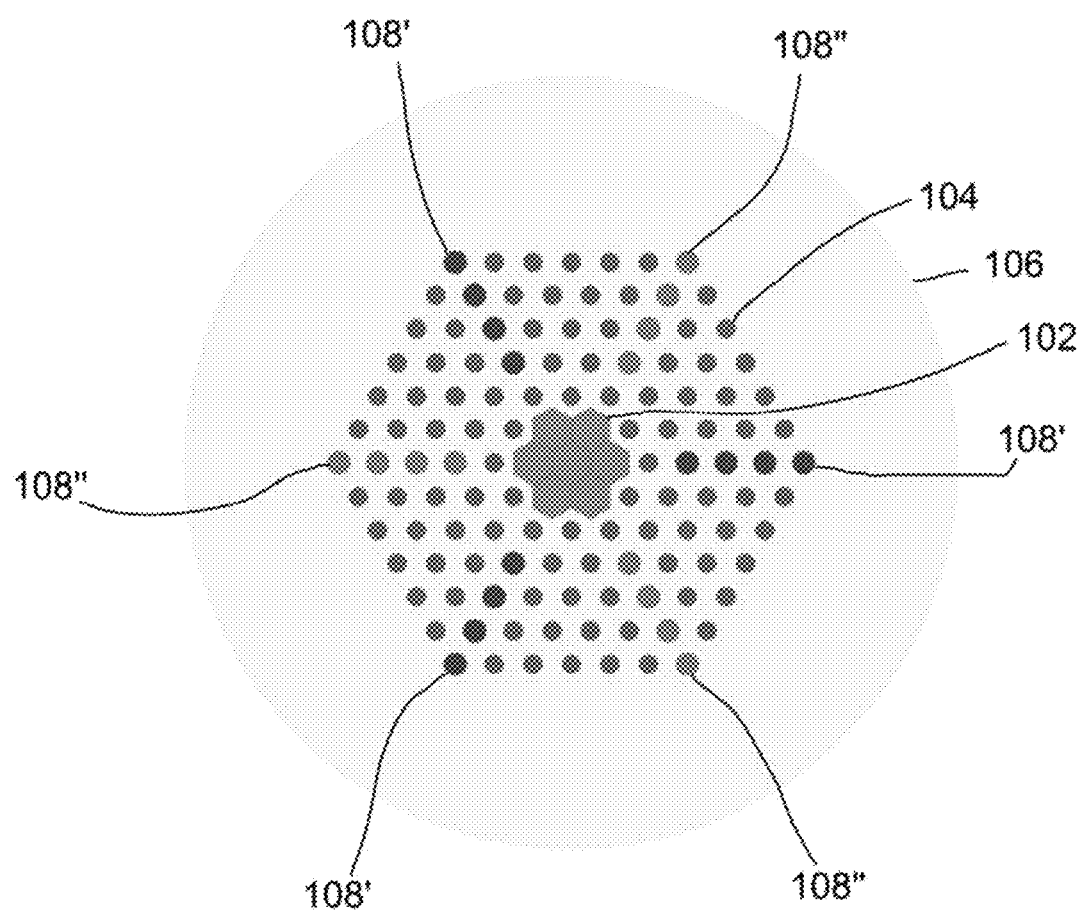
FIG. 12 shows an alternative embodiment of a PCF based with GRINs.

FIG. 12 shows an alternative embodiment of a PCF based with GRINs. The hexagonal structure of the first embodiment allows for six equivalent resonant coupling waveguides, which were chosen there to be identical (in the form of strings of GRINs). However, they are not required to be identical, and allowing for different string properties opens design possibilities. For example, we could consider two groups (108' and 108") of GRINs with the same index contrast but different aspect ratios (ID/OD), or vice versa, or that differed in both contrast and aspect ratio. The losses due to the second group would then be spectrally shifted with respect to the first. The shift could be small, such that the two loss bands overlap and form a wider band in combination. Or the shift could be large, yielding two distinct loss bands and allowing to block two separate spectral lines.

This alternative inherits all the features of the first embodiment, and generalizes it to include the possibility of multiple differing resonant coupling waveguides.

Figure 13:
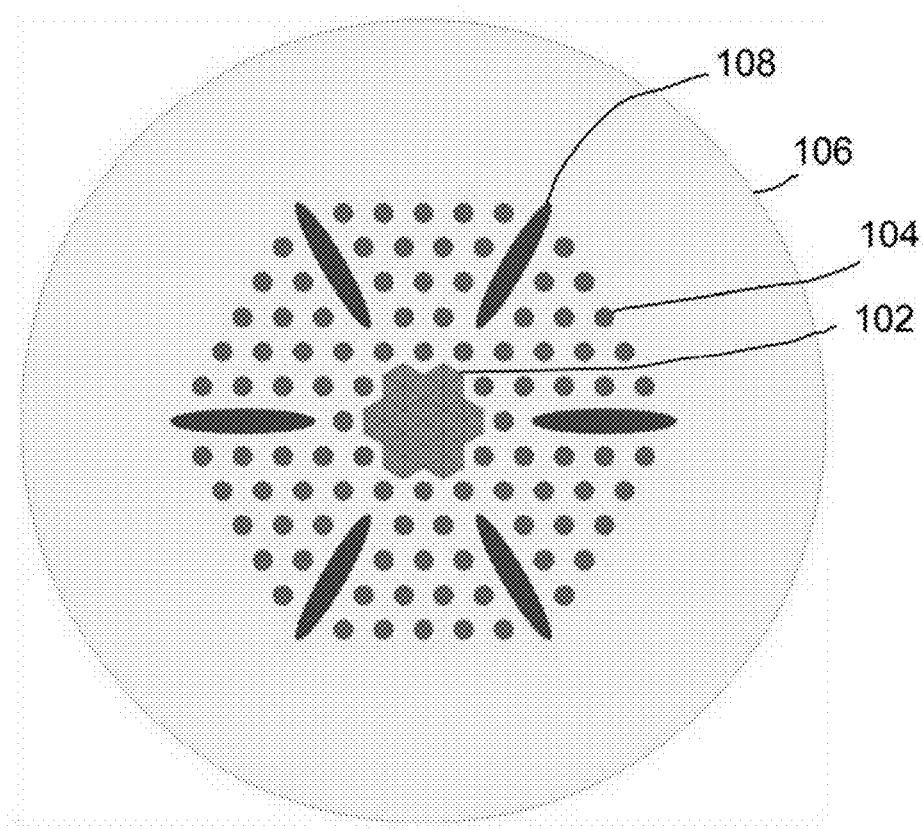
FIG. 13 shows an alternative embodiment which is PCF based with monolithic coupling waveguides.

FIG. 13 shows an alternative embodiment that is PCF based with monolithic coupling waveguides 108. The resonant coupling waveguides of the first described embodiment were chosen in the form of strings of GRINs. As pointed out there, that form yields advantageous loss bands, and furthermore that arrangement is most compatible with the hexagonal grid used in fabrication.

However, there may be cases where the smaller mode spacing (in wavelength) of a monolithic coupling waveguide is desired. For instance, the mode spacing could be chosen so as to provide two or more separated loss bands for multiple line suppression.

This alternative inherits most of the general features of the preferred embodiment, but with the change that the coupling waveguide 114 is here monolithic.

Figure 14:
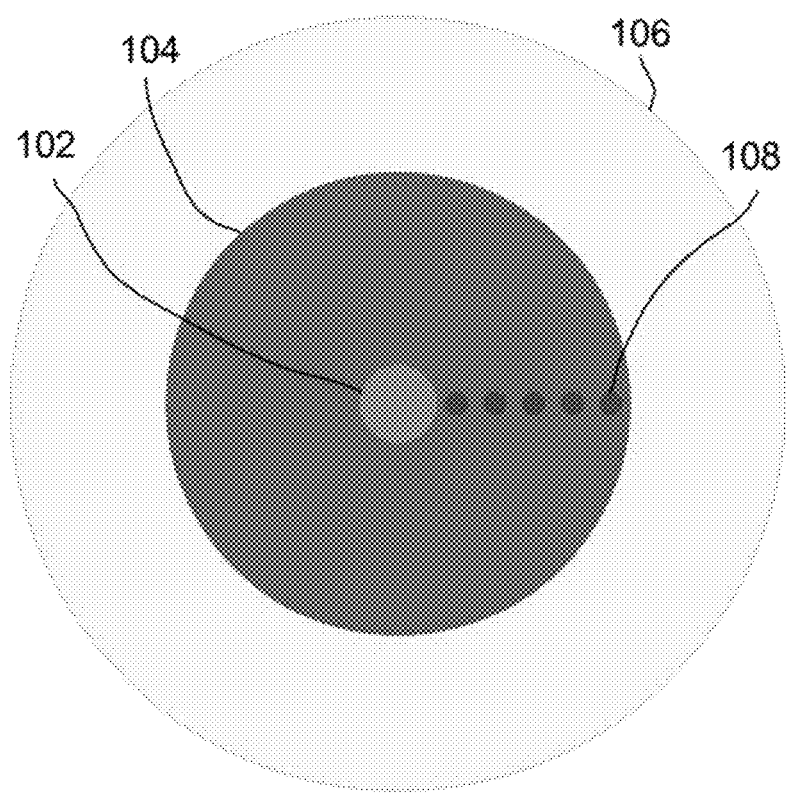
FIG. 14 shows an alternative embodiment having a step index signal core with a raised index sink and where the coupling waveguide is formed as a string of multiple guiding elements.
Figure 15:
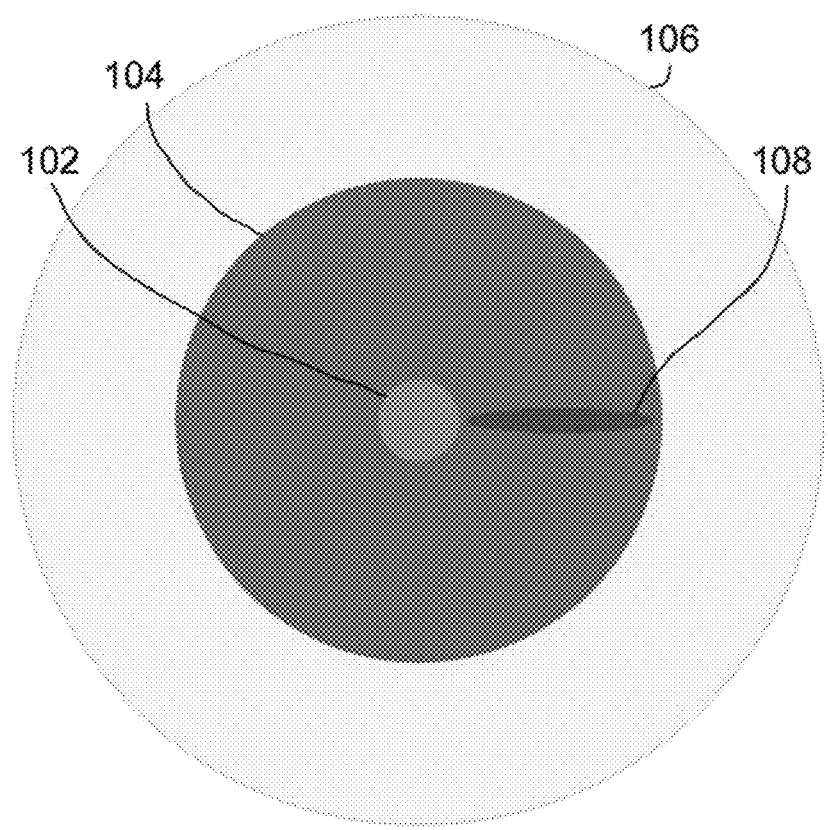
FIG. 15 shows an alternative embodiments having a step index signal core with a raised index sink and where the coupling waveguide is formed as a monlithic guiding element.

FIGS. 14 and 15 show alternative embodiments having a step index signal core with a raised index sink. In the first described embodiment above and the alternative ones above, the core is formed as a defect in the PCF lattice. But all the general rules of thumb can be satisfied also with a step index core and raised index sink, as illustrated by the two embodiments here. Now, the signal core 102 has an index that is raised with respect to its surroundings 104, comprising a 'step index' instead of a PCF core. The sink region 106 also has an index that is higher than that of 104, and it should also be as high or higher than that of the core 102, as required by the condition that it constitute a sink. In the figures, the sink 106 surrounds the core 102 and coupling waveguides 108, and forms the outer mechanical element of the fiber. However, it could as well be a structure internal to the outermost mechanical element, as pointed out in the general principal section above. And as above, the coupling waveguides 108 can be strings of sub-guides as in FIG. 14 or monolithic as in FIG. 15.

These embodiments are still compatible with the 'stack-and-draw' fabrication technique, but they are also compatible with the alternative 'rod-in-tube' technique, which may be an advantage in some cases. However, these embodiments will not allow the large mode sizes available with PCF cores. These alternatives satisfy all of the general rules of thumb laid out at the beginning of this document, and can be readily fabricated. They illustrate that the invention is not restricted in any way to periodic structures like PCF's and PBG fibers (although PCFs are integral to our preferred embodiment).

U.S. patent application Ser. No. 15/288,810, titled "ND$^{3+}$ Fiber Laser and Amplifier" filed on the same day as the present application is incorporated herein by reference.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A waveguide, comprising:
a signal carrying waveguide region configured to propagate one or more modes comprising light having a first wavelength $\lambda_1$ and a second wavelength $\lambda_2$, wherein said signal carrying waveguide region is doped with a lasing element having a first atomic transition and a second atomic transition, wherein said first atomic transition is weaker than said second atomic transition, wherein said first atomic transition lases at said first wavelength $\lambda_1$ and not at said second wavelength $\lambda_2$ and wherein said second atomic transition lases at said second wavelength $\lambda_2$ and not at said first wavelength $\lambda_1$;
a sink region; and
an auxiliary waveguide region configured to resonantly couple light of said second wavelength $\lambda_2$, and not said first wavelength $\lambda_1$, from said signal carrying waveguide region to said sink region.

2. The waveguide of claim 1, wherein said auxiliary waveguide region is configured such that said signal carrying waveguide region experiences wavelength selective coupling of said wavelength $\lambda_2$ through said auxiliary waveguide region to said sink region.

3. The waveguide of claim 2, wherein said auxiliary waveguide region is configured such that light at said wavelength $\lambda_2$ will flow out of said signal carrying waveguide region to said sink region.

4. The waveguide of claim 1, wherein said auxiliary waveguide region is configured such that said signal carrying waveguide region and said sink region experience no coupling except through said auxiliary waveguide region.

5. The waveguide of claim 2, wherein said auxiliary waveguide region is configured such that said wavelength selective coupling occurs when the effective index of each mode of the one or more modes in said signal-carrying waveguide region and at least one mode of the one or more modes supported by said auxiliary waveguide region are closely matched at said wavelength $\lambda_2$ and not at said wavelength $\lambda_1$.

6. The waveguide of claim 5, wherein said signal carrying waveguide region comprises a first effective index that has only a weak dependence on wavelength and wherein said auxiliary waveguide region comprises a second effective index that varies strongly with wavelength.

7. The waveguide of claim 5, wherein said signal carrying waveguide region comprises a first effective index and wherein said auxiliary waveguide region comprises a second effective index, wherein said first effective index and said second effective index vary strongly and oppositely for said wavelength $\lambda_1$ and said wavelength $\lambda_2$.

8. The waveguide of claim 1, wherein said sink region is configured to support many modes with effective indices higher than that of the relevant mode in said auxiliary waveguide region.

9. The waveguide of claim 1, wherein said sink region is configured to support a continuum of modes with effective indices higher than that of the relevant mode in said auxiliary waveguide region.

10. The waveguide of claim 1, wherein said sink region is configured to be dissipative of light of said wavelength $\lambda_2$.

11. The waveguide of claim 1, wherein said sink region is configured to be absorbing of light said wavelength $\lambda_2$.

12. The waveguide of claim 1, wherein said sink region is configured such that it supports more modes than said signal carrying waveguide region, such that sharing of light between said signal carrying waveguide region and said sink region reduces the light content in said signal carrying waveguide region.

13. The waveguide of claim 12, wherein said sink region is configured such that the modes in said sink region experience strong and randomly varying coupling.

14. The waveguide of claim 13, wherein said randomly varying coupling comprises longitudinal variations in said sink region.

15. The waveguide of claim 12, wherein the distance over which light returns to said signal carrying waveguide region (the 'revival' distance) is longer than said waveguide.

16. The waveguide of claim 1, wherein said signal carrying waveguide region includes a first portion that comprises an effective index of refraction that is matched to that of said sink region.

17. The waveguide of claim 1, wherein said signal carrying waveguide region includes a first portion that comprises an effective index of refraction that is closer to that of said sink region than that of said auxiliary waveguide region.

18. The waveguide of claim 1, wherein said signal carrying waveguide comprises dopant.

19. The waveguide of claim 18, wherein said dopant comprises lasing dopant.

20. The waveguide of claim 18, wherein said dopant comprises a rare earth element.

21. The waveguide of claim 19, wherein said lasing dopant is selected from the group consisting of Neodymium, Erbium, Erbium/Ytterbium, Samarium, Terbium and Thulium.

22. The waveguide of claim 1, wherein the cross-sectional shape of said waveguide is selected from the group consisting of round, rectangular, hexagonal and annular.

23. The waveguide of claim 16, wherein a lattice is provided such that said signal carrying waveguide region is configured to confine light of a given wavelength ($\lambda_1$), wherein said lattice comprises strands of material having an effective index of refraction that is lower than that of said first portion of said signal carrying waveguide region.

24. The waveguide of claim 23, wherein said auxiliary waveguide region is included within said lattice and comprises strands having an effective index of refraction at said wavelength $\lambda 2$ that is no less than that of said first portion of said signal carrying waveguide region.

25. The waveguide of claim 23, wherein said lattice further comprises material having an effective index of refraction at said wavelength $\lambda_2$ that is no less than that of said first portion of said signal carrying waveguide region.

26. The waveguide of claim 25, wherein said material comprises monolithic coupling waveguides.

27. The waveguide of claim 1, wherein said signal carrying waveguide region comprises a step index and wherein said sink region comprises a raised index sink.

28. The waveguide of claim 27, wherein said step index is formed by a core portion having an index that is raised within respect to a surrounding region, wherein said sink region has an index of refraction that is higher than that of said surrounding region and is also at least as high as that of said core portion.

29. The waveguide of claim 27, wherein said auxiliary waveguide region comprises a monolithic coupling waveguide.

30. The waveguide of claim 1, wherein said auxiliary waveguide region is configured such that said signal carrying waveguide region experiences wavelength selective coupling of said wavelength $\lambda_2$ through said auxiliary waveguide region to said sink region and wherein there is no coupling of wavelength $\lambda_1$ through said auxiliary waveguide region to said sink region.

31. The waveguide of claim 1, wherein said auxiliary waveguide region comprises a plurality of coupling waveguides.

32. The waveguide of claim 1, wherein said auxiliary waveguide region comprises a monolithic coupling waveguide.

33. The waveguide of claim 1, wherein said signal carrying waveguide region is configured to propagate one or more additional wavelengths, wherein said auxiliary waveguide region is configured to resonantly couple at least one additional wavelength of said one or more additional wavelengths from said signal carrying waveguide region to said sink region.

* * * * *